United States Patent [19]

Chen

[11] Patent Number: 5,033,202
[45] Date of Patent: Jul. 23, 1991

[54] HEIGHT GAUGE

[76] Inventor: Wen P. Chen, 8F-1, 141, Ho-Ping W. Rd., Sec. 2, Taipei, Taiwan

[21] Appl. No.: 527,726

[22] Filed: May 23, 1990

[51] Int. Cl.⁵ .................................................. G01B 3/08
[52] U.S. Cl. ........................................ 33/768; 33/759; 33/770; 33/769
[58] Field of Search ................................ 33/759–771, 33/832, 833, 809, 810, 27.03

[56] References Cited

U.S. PATENT DOCUMENTS

| 2,728,143 | 12/1955 | Buchet | 33/761 |
| 2,854,753 | 10/1958 | Caparros | 33/762 |
| 4,186,490 | 2/1980 | Quenot | 33/762 |
| 4,896,432 | 1/1990 | Kang | 33/768 |

FOREIGN PATENT DOCUMENTS

| 1320169 | 1/1963 | France | 33/768 |
| 0054104 | 4/1980 | Japan | 33/768 |

Primary Examiner—Harry N. Haroian
Attorney, Agent, or Firm—Wenderoth, Lind & Ponack

[57] ABSTRACT

A suspension-type height measuring device has a main measuring unit having a first tape containing case with a spring loaded first tape reel therein and a first brake device controlled by a first control key, a right-angled rule having a second tape containing case with a spring loaded second tape reel therein and a second brake device controlled by a second control key, and a measuring tape with opposite ends wound on the respective tape reels. The first tape case can be attached to a support at a height no greater than the length of the measuring tape and the first control key actuated to release the measuring tape, and an indication set to zero and the second control key engaged with the second brake device for gripping the measuring tape, and the right-angled rule can be moved downwardly to a floor at the foot of the support for unwinding the measuring tape from the first reel, and then the second control key can be actuated to release the measuring tape and the right-angled rule can be allowed to rise to wind the measuring tape onto the second tape reel, and thereafter the height of a person standing under the device can be measured by lowering the right-angled rule and reading the height of the person through a viewing device.

3 Claims, 7 Drawing Sheets

HEIGHT GAUGE

BACKGROUND AND SUMMARY OF THE INVENTION

The present invention relates to a height measuring device and, more particularly, to a height measuring device which can be mounted at any location on a wall and which in use after having been reset to zero enables a user to read out a measurement of his height directly from the display window by pulling down a movable right-angled rule onto the top of his head. Alternatively, the user can read out his height from a counter or from an electronic display. The measuring tape has a series of small holes at a uniform pitch which rotate a pin wheel which in turn drives a cluster gear system or a high precision variable resistance and the height is shown on the counter or display through a mechanical or electrical transfer.

Conventionally, a height gauge includes a long sliding rule vertically arranged on a base plate. Because the gauge occupies much space in a room, it is not commonly used by families.

Accordingly, an object of the present invention is to provide a height measuring device which, because it is a suspension type, can be hung on a wall when not in use and thus occupies no space in a room, and which is very convenient to use and will be generally accepted by families.

The height measuring device of the invention comprises a main measuring unit and a movable right-angled rule, both of which includes a housing, a measuring tape reel and a control key for stopping the tape.

DESCRIPTION OF THE DRAWINGS

Other objects and features of the present invention will be clear from the accompanying drawings, in which.

DESCRIPTION OF THE PREFERRED EMBODIMENTS

Referring now to the accompanying drawings, several embodiments of the present invention will be described in detail.

Figure 1:
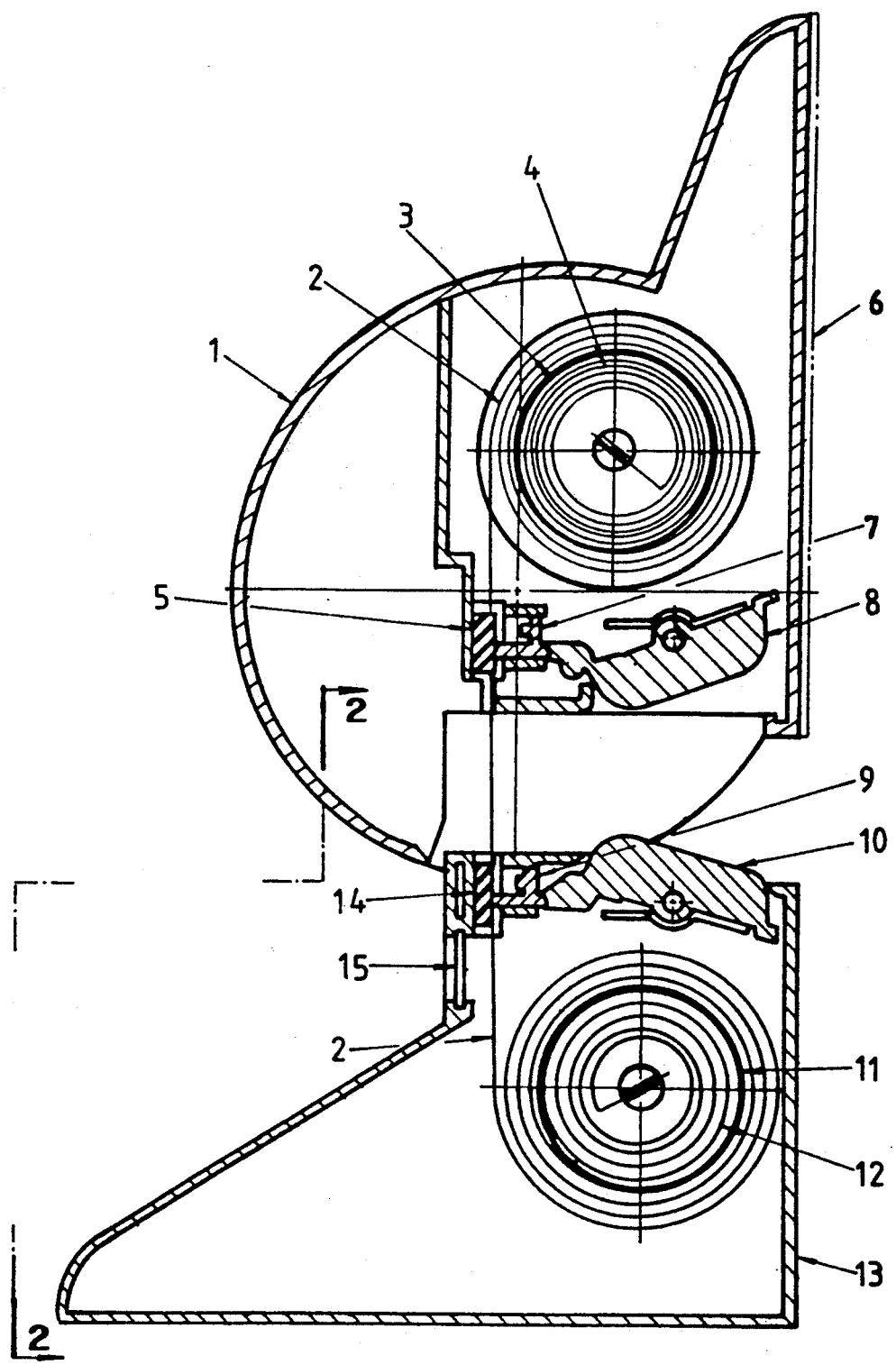
FIG. 1 is a sectional elevation view showing the construction of the first embodiment of a height measuring device in accordance with the invention.

In FIG. 1, reference numeral 1 designates the main measuring unit, which comprises a tape 2 and a tape protecting case 3, a tape rewind torsional spring 4, a rubber sheet 5, a stop piece 7 and a control key 8. By pushing down the control key 8, it is possible to press the stop piece 7 against the rubber sheet 5 so that the tape 2 is firmly gripped in position therebetween. Reference numeral 13 designates a movable right-angled rule, which includes thereinside a tape casing 11 around which the other end of the tape 2 of the main measuring unit 1 is wound, a rubber sheet 14, a stop piece 9 and a control key 10. This control key 10 performs the same action as that of the control key 8 in the main measuring unit 1 for gripping the tape firmly in to the movable right-angled rule and both control keys 8 and 10 are utilized in the return-to-zero installation.

A return-to-zero method for installing the height measuring device of the present invention on a wall will now be described.

The device can be stuck at any height on the wall and, during installation, it is necessary that the index on the tape which appears through the display window 15 of the right-angled rule 13 be at the zero position and then the stop control key 10 is pressed down to the "stop" position to hold the tape 2 tightly to the right-angled rule 13.

Next, the right-angled rule 13 is pulled down onto the ground, and is temporarily held in position on the ground. Then, the stop control key 8 on the measuring unit 1 is pressed down to the "stop" position, and for digital models of the second and third embodiments, it is necessary that the return-to-zero numeric button next be pressed down.

Finally, the stop control key 10 on the right-angled rule 13 is pressed down to the "free" position and the right-angled rule is returned to the measuring unit.

Figure 2:
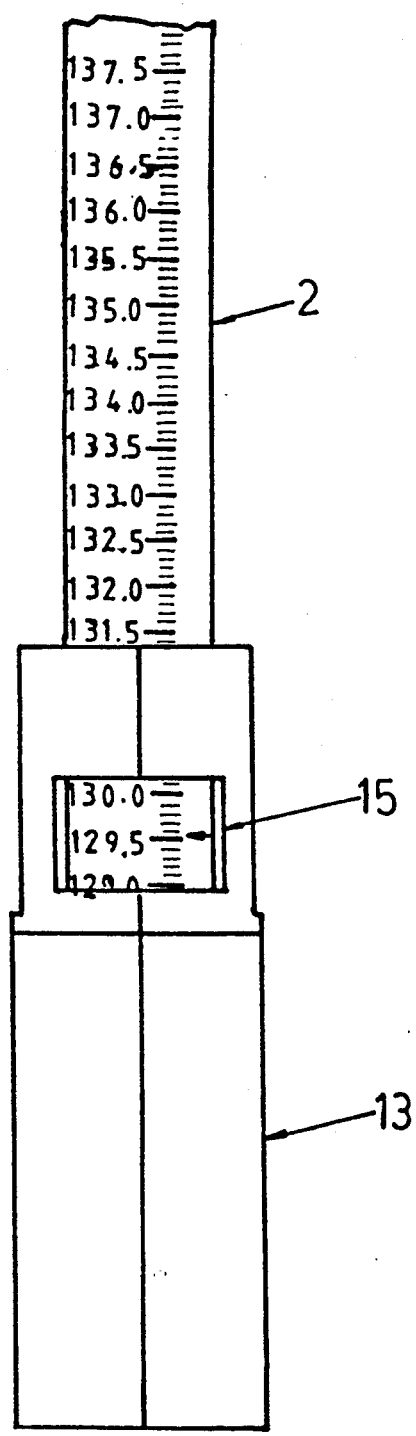
FIG. 2 is a front view of the height measuring device taken from the line 2—2 in FIG. 1.

In the use of the device of the present invention, it is necessary that the control key on the right-angled rule 13 be in the free position so that the movable right-angled rule 13 can be freely vertically moved along the wall for taking a measurement of a person's height. FIG. 2 shows a view of the height measuring device taken from the line 2—2 in FIG. 1, in which the movable right-angled rule 13 is shown as having the height display window 15 through which a value of the body height can be shown.

Figure 3:
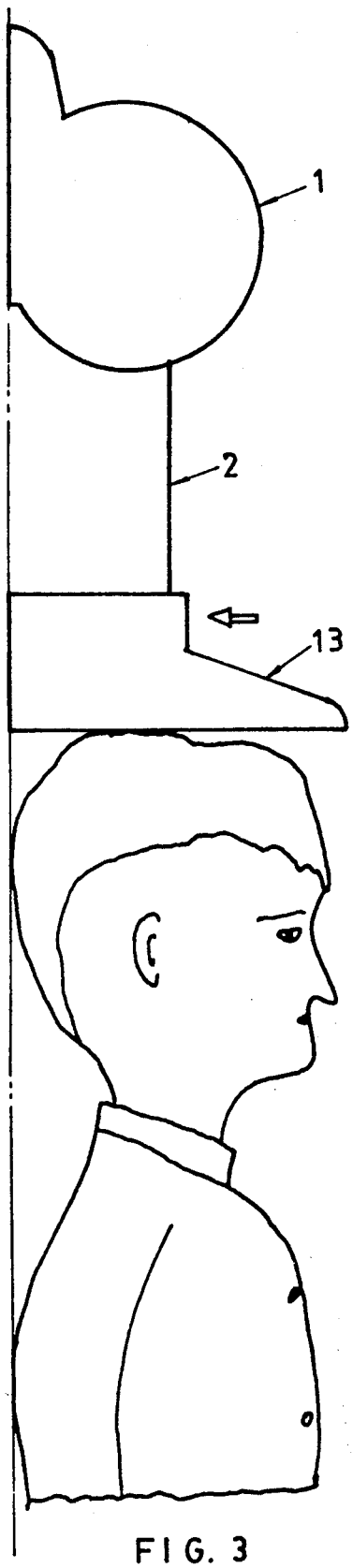
FIG. 3 is a side elevation view of the device in use.
Figure 4:
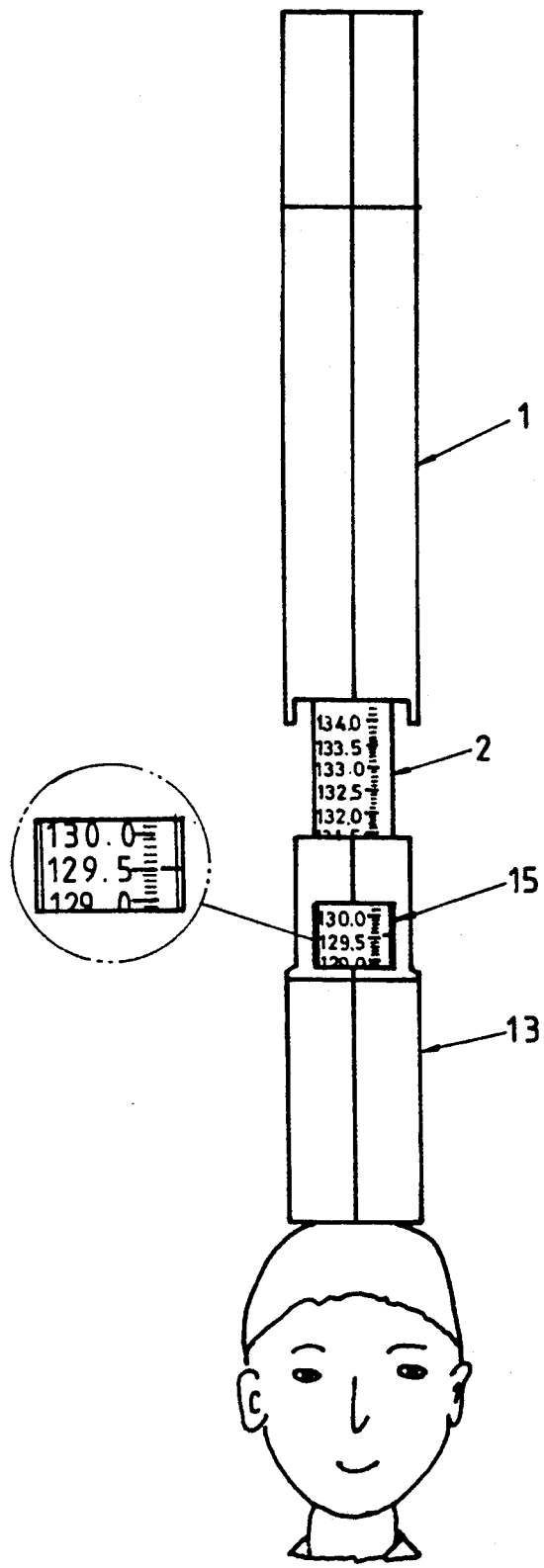
FIG. 4 is a front elevation view of the device shown in FIG. 3.

When using the device of the invention to measure body height, the movable right-angled rule 13 is pulled down to the top of a person's head as shown in FIGS. 3 and 4 and the height of the person can thus be read out directly from the display window 15 on the movable right-angled rule 13.

Figure 5:
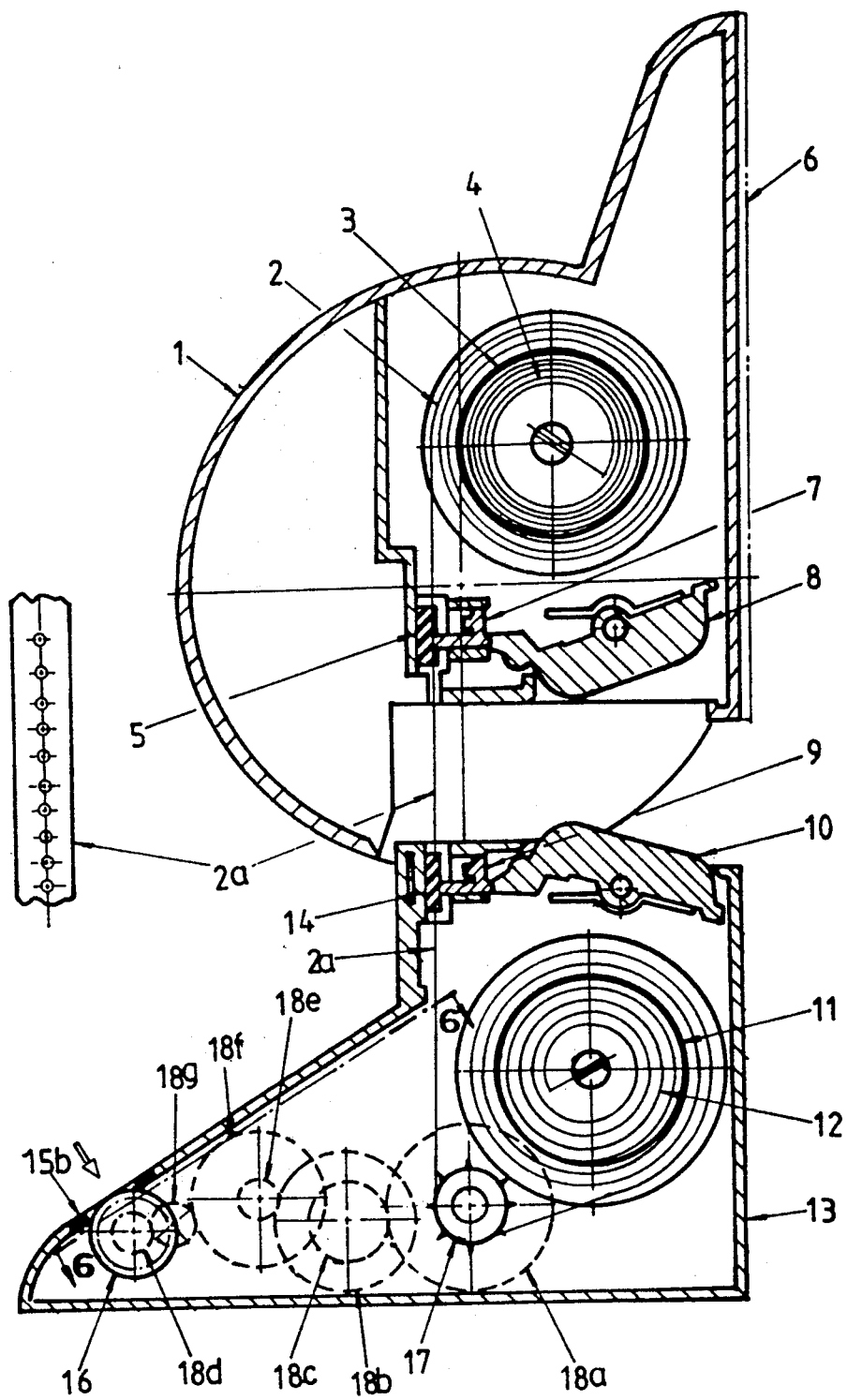
FIG. 5 is a sectional elevation view showing the construction of the second embodiment of the device.
Figure 6:
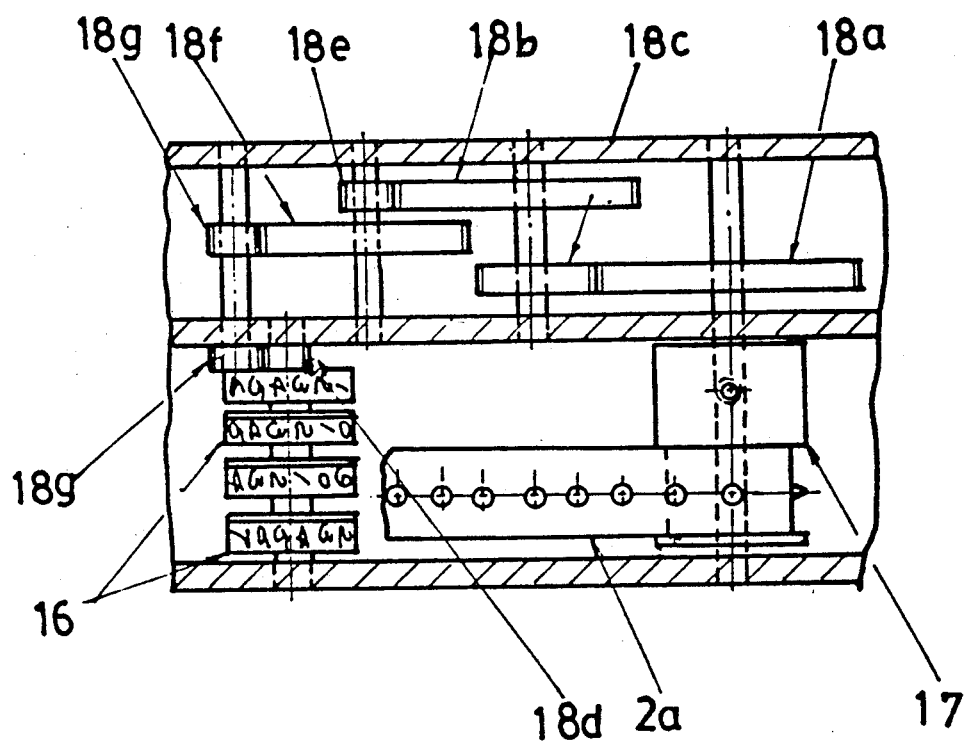
FIG. 6 is a sectional view of the device taken along the line 6—6 of FIG. 5.

FIGS. 5 and 6 illustrate the second embodiment of the height measuring device of the present invention, and its principle and construction are more or less the same as the first embodiment except that, in the present embodiment, the tape 2a is a tape having a series of small holes at an equal pitch. The tape with the small holes is reeved around a pin wheel 17 to rotate the pin wheel 17 as the right-angled rule is lowered, which in turn drives a train of gears 18a to 18g to drive a counter. By making the number of turns the counter 16 is rotated in be a certain proportion to the distance of movement of the tape, it is possible then to read out the height FIGURE on the counter directly from the display window 15b in the casing of the right-angled rule 13.

Figure 7:
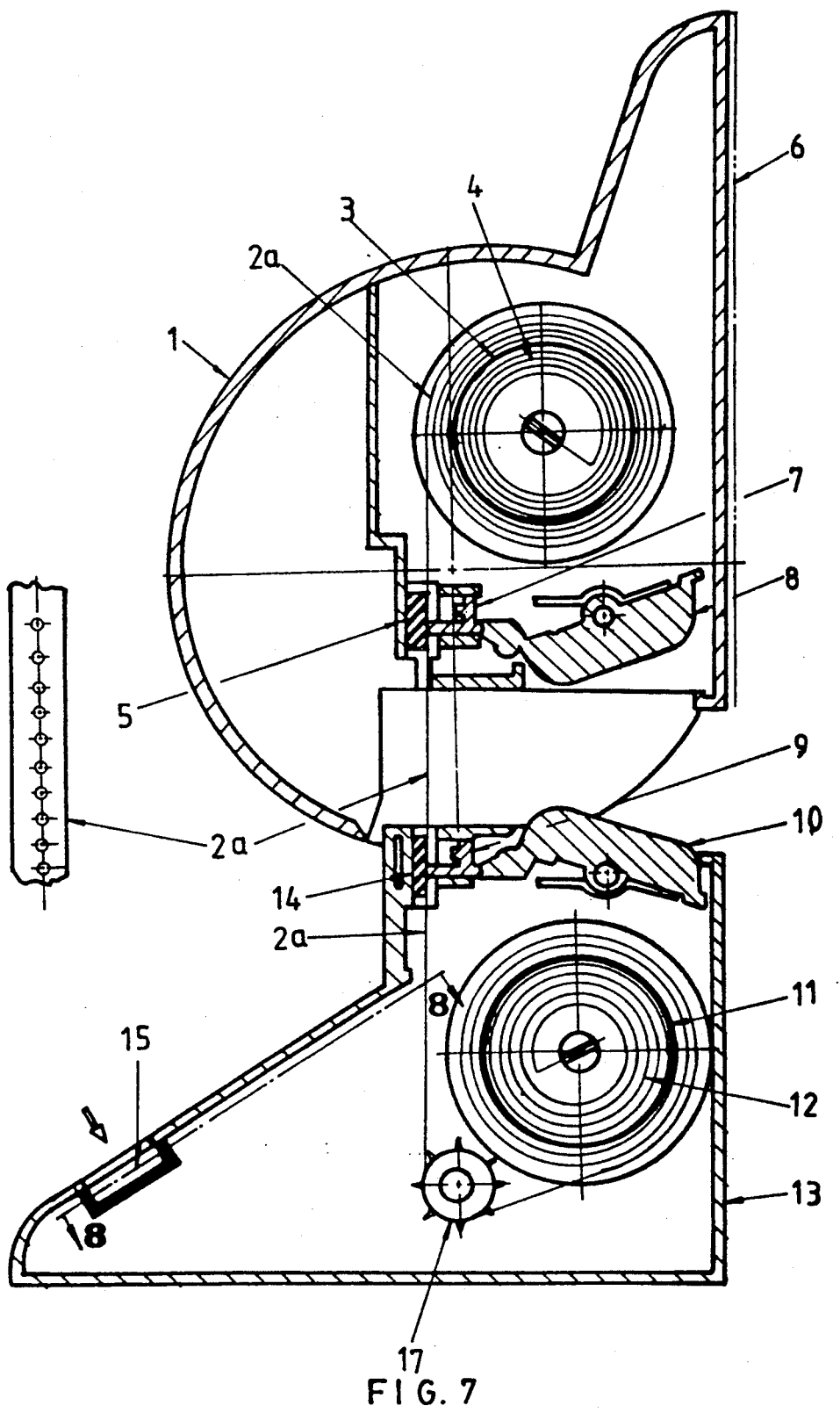
FIG. 7 is a sectional elevation view showing the construction of the third embodiment of the device.
Figure 8:
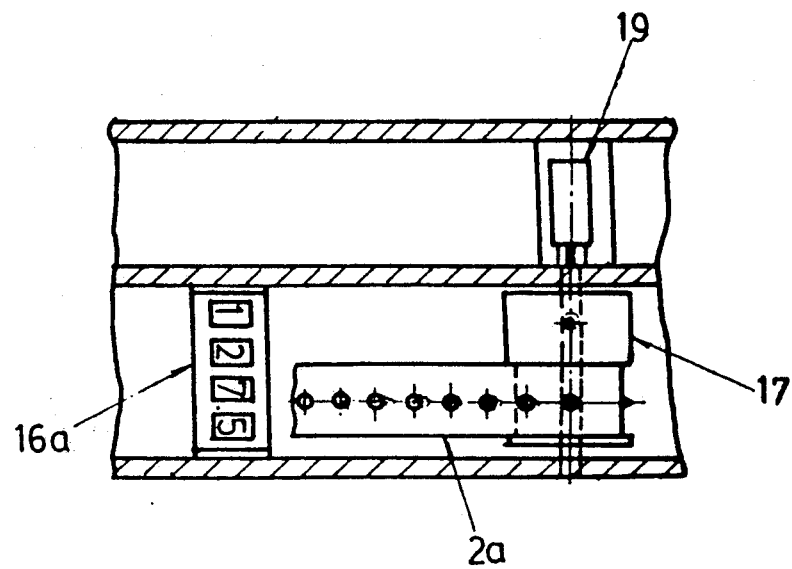
FIG. 8 is a sectional view of the device taken along the line 8—8 of FIG. 7.
Figure 9:
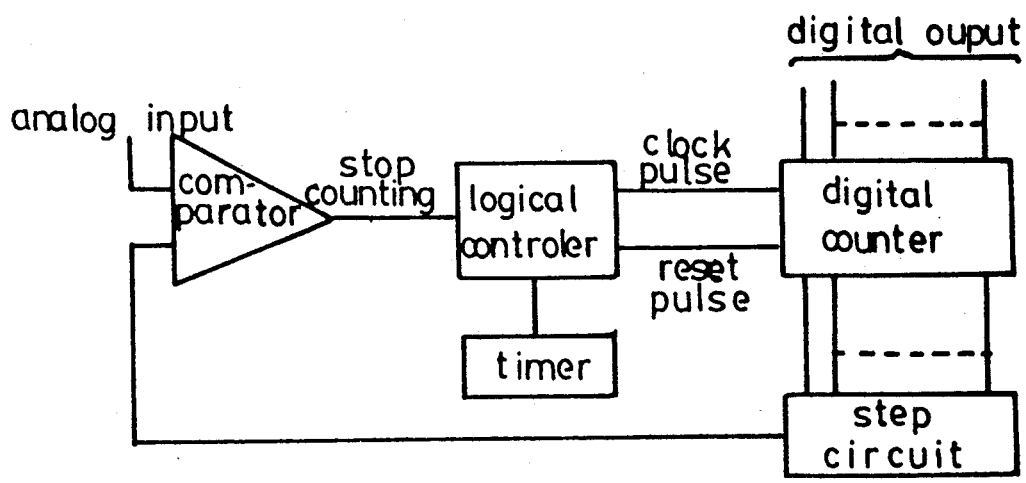
FIG. 9 is a block diagram illustrating the circuit in the third embodiment of the invention.

FIGS. 7 and 8 show the third embodiment of the height measuring device of the present invention, the construction of which is essentially similar to that of the second embodiment, differing only in that the tape 2a moves the pin wheel 17, which in turn directly drives a precise variable resistance 19, thereby making the electric voltage transmitted by the precise variable resistance in a definite proportion to the movement of the tape 2a. This electric voltage becomes an analog input to the digital-analog converter of FIG. 9 and is subjected to calculation through the comparator and the logical control unit so that a corresponding numerical output is produced in the digital counter. The numerical output can then be shown on the digital display 16a of FIG. 8.

As described above, the present invention has provided a most useful and novel construction of the height measuring device.

While some preferred embodiments of the invention have been shown and described, it will be apparent to those skilled in the art that various changes and modification may be made therein without departing from the spirit and scope of the invention as claimed.

What is claimed is:

1. A suspension-type height measuring device, comprising:

a measuring tape;

a main measuring unit having a first tape containing case, a first tape reel rotatably mounted in said first tape containing case and on which one end of said measuring tape is wound, a tape rewind torsion spring connected to said first tape reel for rotating first tape reel in a direction for winding up said measuring tape thereon, a first brake means past which said measuring tape extends, and a first control key engagable with said first brake means for operating said first brake means for firmly gripping said measuring tape or releasing said measuring tape for movement; and a right-angled rule having a second tape containing case thereon, said second tape containing case having a second tape reel rotatably mounted therein and on which the other end of said measuring tape is wound, a further tape rewind torsion spring connected to said second tape reel for rotating said second tape reel in a direction for winding up said measuring tape thereon, a second brake means past which said measuring tape extends, a second control key engagable with said second brake means for firmly gripping said measuring tape or releasing said measuring tape, and a viewing means for viewing an indication of the length of tape which has been drawn out of said second tape containing case; whereby said first tape case can be attached to a support at a height no greater than the length of the measuring tape and said first control key actuated to release said measuring tape, said indication can be set to zero and the second control key engaged with said second brake means for gripping said measuring tape, and said right-angled rule can be moved downwardly to a floor at the foot of the support for unwinding said measuring tape from said first tape reel, and then said second control key can be actuated to release the measuring tape and said first control key actuated to grip said measuring tape and said right-angled rule can be allowed to rise to wind said measuring tape onto said second tape reel, and thereafter the height of a person standing under said device can be measured by lowering said right-angled rule and reading the height of the person through said viewing means.

2. A measuring device as claimed in claim 1 in which said tape has a plurality of small holes therein at a uniform pitch therealong, and said second tape case has a pin wheel rotatably mounted therein over which said tape runs with the pins on said pin wheel engaging in said small holes for causing said pin wheel to be driven by said tape as said tape is wound on and unwound from said second tape reel, a variable resistance to which said pin wheel is connected for varying the resistance in proportion to the amount of rotation of said pin wheel, and an electronic conversion and display means for converting the varied resistance into a measured height value proportional to the amount of rotation of said pin wheel and displaying said value through said viewing means.

3. A measuring device as claimed in claim 1 in which said tape has a plurality of small holes therealong at a uniform pitch therealong, and said second tape case has a pin wheel rotatably mounted therein over which said tape runs with the pins on said pin wheel engaging in said small holes for causing said pin wheel to be driven by said tape as said tape is wound on and unwound from said second tape reel, a gear cluster to which said pin wheel is connected for being driven by said pin wheel, and a mechanical counted driven by said gear cluster and having an indication of a measured height value proportional to the amount of rotation of said pin wheel displayed through said viewing means.

* * * * *